(12) United States Patent
Lewis et al.

(10) Patent No.: US 6,710,478 B1
(45) Date of Patent: Mar. 23, 2004

(54) CENTRIFUGAL ACTUATOR

(75) Inventors: William R. Lewis, Hazelwood, MO (US); Barry M. Newberg, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/288,035

(22) Filed: Nov. 5, 2002

(51) Int. Cl.[7] ................................................. H02K 5/24
(52) U.S. Cl. ....................... 310/51; 310/68 R; 310/68 E
(58) Field of Search ............................. 310/51, 68 R, 310/68 E

(56) References Cited

U.S. PATENT DOCUMENTS

| | | | |
|---|---|---|---|
| 3,609,421 A | 9/1971 | Hildebrandt | ................. 310/68 |
| 5,293,090 A | * 3/1994 | Heilman | ...................... 310/68 |
| 6,181,037 B1 | 1/2001 | Jones et al. | |
| 6,437,467 B1 | * 8/2002 | Schierling | .................... 310/51 |

* cited by examiner

Primary Examiner—Nicholas Ponomarenko
Assistant Examiner—Iraj A. Mohandesi
(74) Attorney, Agent, or Firm—Thompson Coburn LLP

(57) ABSTRACT

A centrifugal actuator of an electric motor is modified to reduce noise produced by torque pulses of the motor. The centrifugal actuator comprises a damper sleeve that is mounted in a tight friction fit on the motor shaft. The main body of the centrifugal actuator is mounted on the damper sleeve by a friction fit which permits limited rotational movement of the actuator main body relative to the actuator damper sleeve. In addition, pairs of tabs are provided on both the actuator main body and the actuator damper sleeve and are positioned in circumferentially overlapping relationships whereby engagement of the main body and damper sleeve tabs provides a positive driving connection between the main body and damper sleeve.

21 Claims, 3 Drawing Sheets

CENTRIFUGAL ACTUATOR

BACKGROUND OF THE INVENTION (1) Field of the Invention

The present invention pertains to a centrifugal actuator of an electric motor that has been modified to reduce noise produced by the operation of the actuator. More specifically, the present invention pertains to a centrifugal actuator comprising a damper sleeve that mounts the actuator to the shaft of an electric motor and permits limited rotational movement of the actuator relative to the shaft to reduce the transmission of acceleration pulses from the shaft to the actuator and thereby reduce chattering of the centrifugal actuator.

(2) Description of the Related Art

Electric motors having stators with separate start windings and run windings typically employ centrifugal actuators to control the energization of the two windings. The start windings are energized during startup of the motor, or when the speed of the motor falls below a specified operating speed, so as to create a rotating magnetic field in the motor stator and to apply sufficient torque to the motor rotor for starting purposes. However, once the motor has accelerated to a desired operating speed, or to a predetermined percentage of the desired operating speed, the rotor is able to follow the alternations of the magnetic field created by the run windings and the start windings are no longer needed. At this point In the motor's operation the centrifugal actuator automatically switches over energization of the start windings to the run windings.

Usually, the start windings are not intended for continuous use and may fail if not de-energized during normal operation of the motor. Conventionally, a switch referred to as a motor starting switch is provided on the motor for energizing the start windings only during startup of the motor and for de-energizing the start windings once the motor has attained its desired operating speed. A centrifugal actuator is typically employed in switching the motor windings between their start windings and run windings. The centrifugal actuator is mounted on the motor shaft for rotation with the shaft, and is responsive to the speed of the motor shaft for switching the motor start switch between the start windings and the run windings, and visa versa.

A typical centrifugal actuator is disclosed in the U.S. Patent of Hildebrandt, U.S. Pat. No. 3,609,421, which issued on Sep. 28, 1971, and is incorporated herein by reference. Basically, the centrifugal actuator includes a main body that is mounted on the electric motor shaft for rotation with the shaft. An actuator sleeve is mounted on the main body for axially reciprocating movement of the actuator sleeve over the main body between first and second positions of the actuator sleeve relative to the motor shaft. The sleeve has an annular flange that projects radially outwardly from the sleeve. The centrifugal actuator is positioned on the shaft so that the annular flange of the actuator sleeve is positioned adjacented to the start switch of the motor that completes the circuits through the start windings and the run windings of the motor. In the operation of the actuator sleeve to be explained, the switch completes a circuit through the start windings or the run windings of the motor in response to the actuator sleeve moving between its respective first and second axially displaced positions on the motor shaft The actuator sleeve and its annular flange are biased by a pair of springs on the actuator toward the first position of the sleeve relative to the shaft. The springs extend transversely across opposite sides of the motor shaft and the actuator body and are connected between a pair of levers mounted on the actuator body on opposite sides of the motor shaft. The levers are mounted on the actuator body for pivoting movement of the levers relative to the body. Each of the levers is formed as a bell crank having one end connected to the actuator sleeve and the opposite end connected to a weight. Each of the levers has an intermediate portion that is mounted for pivoting movement on the actuator body. The pair of springs exert a biasing force on the levers pulling the weighted ends of the levers radially inwardly, and thereby bias the actuator sleeve toward its first position relative to the actuator body and the motor shaft.

On startup of the electric motor the switch of the motor is in position to complete a circuit through the start windings of the motor. The run windings circuit is open. Thus, the circuit through the start windings causes initial rotation of the motor shaft. When rotation of the shaft and the centrifugal actuator reaches a predetermined speed, the centrifugal force exerted on the weighted ends of the actuator levers causes the weighted ends to move radially outwardly against the bias of the pair of springs. This in turn causes the opposite ends of the levers that engage with the actuator sleeve to move the sleeve from its first axial position relative to the shaft to its second axial position relative to the shaft. This movement of the sleeve causes the sleeve annular flange to switch the motor switch from its position closing the circuit through the start windings to its position closing the circuit through the run windings where the start windings circuit is opened. When the speed of rotation of the shaft falls below the predetermined speed the pair of springs pull the weighted ends of the levers radially Inwardly, thereby causing the opposite ends of the levers to move the actuator sleeve from its second position relative to the shaft to its first position relative to the shaft. This in turn causes the sleeve annular flange to switch the motor switch from its position closing the circuit of the run windings back to its position closing the circuit of the start windings.

The construction of the centrifugal actuator described above is typical among prior art centrifugal actuators. Most actuators basically employ an actuator sleeve and a pair of lever arms mounted on the main body of the actuator for movement relative to the main body and the motor shaft However, this simplified and inexpensive construction of the typical centrifugal actuator has its disadvantages. The actuator main body has a center bore that is mounted in tight engagement around the motor shaft. Because the motor rotor on the shaft is basically rotated by rotating magnetic fields created in the windings of the motor stator, the rotor and the motor shaft are continuously subjected to a series of torque pulses that rotate the rotor and the motor shaft. These torque pulses are transmitted from the motor shaft through the tight engagement of the actuator main body on the shaft to the component parts of the actuator, i.e., the actuator sleeve and the actuator weighted levers. The series of torque pulses often produce a clicking or chattering noise in the component parts of the centrifugal actuator that is very undesirable in certain applications of the electric motors, in particular where the electric motors are used In home appliances.

The prior art solution to reducing the vibration-induced clicking or chattering, noise of the centrifugal actuator was to mount the centrifugal actuator in a friction fit on the motor shaft that allowed some relative movement between the actuator and shaft. This would reduce the transmitted vibration due to the torque pulses of the motor that would produce the noise in the component parts of the actuator. However, it was still necessary for the centrifugal actuator to rotate with the motor shaft in order for it to function properly in switching between the start and run windings of the motor. Therefore, a pair of annular grooves were machined in the motor shaft adjacent to the opposite ends of the centrifugal actuator. A lubricated caring was assembled into one of the grooves at one side of the actuator and the actuator was provided with serrations that extended radially inwardly into the other groove on the opposite side of the actuator. The centrifugal actuator would be mounted on the motor shaft between the pair of groves with the c-ring and serrations mounted in the grooves. The positioning of the grooves on the shaft and the positioning of the c-ring and serrations mounted in the grooves provided limited axial movement of the centrifugal actuator on the shaft between the grooves. The engagement of the actuator serrations in one of the grooves locates the actuator axially on the shaft relative to the switch. An axial projection on the actuator extended into the gap of the c-ring and would engage against one end of the c-ring to transmit rotation of the shaft to the actuator. As described in the earlier referenced patent of Hildebrandt U.S. Pat. No. 3,609,421, with this construction of the actuator, the torque pulses transmitted from the motor shaft to the centrifugal actuator were attenuated and the clicking or chattering noise of the actuator was reduced. However, because the c-ring would move under the acceleration and deceleration loads of the centrifugal actuator, it was necessary that the c-ring be lubricated to prevent shaft wear requiring an additional manufacturing step. In addition, providing the annular grooves in the motor shaft adjacent to the centrifugal actuator and the assembly of the c-ring into one of the annular grooves also required additional manufacturing steps that increased the cost associated with assembly of the motor.

SUMMARY OF THE INVENTION

The centrifugal actuator of the present invention overcomes the disadvantages associated with prior art centrifugal actuators by providing a centrifugal actuator construction that employs a damping sleeve that mounts the actuator to a motor shaft and dampens the clicking or chattering noise of the actuator components due to vibration from torque pulses transmitted from the motor shaft to the actuator. The damper of the invention also eliminates the additional expense of machining a pair of annular grooves in the motor shaft and assembling a pair of lubricated c-rings into the annular grooves.

The centrifugal actuator of the invention is comprised of many of the component parts of a typical, prior art centrifugal actuator such as that disclosed in the earlier referenced U.S. Pat. No. 3,609,421. The actuator of the invention includes the main body having an interior bore that is mounted on the motor shaft. An actuator sleeve with an annular flange is mounted on the exterior surface of the main body for axially reciprocating movement of the sleeve over the main body. A pair of weighted levers are mounted on the main body for pivoting movement of the levers relative to the main body that cause the axial movement of the actuator sleeve. A pair of springs interconnect the pair of levers and bias the levers radially inwardly, thereby biasing the actuator sleeve to its first position relative to the main body.

The actuator of the present invention differs from the prior art actuator in that the main body interior bore is dimensioned slightly larger than the exterior diameter of the motor shaft, providing a clearance between the main body interior bore and the motor shaft. A damper sleeve is mounted on the motor shaft in a tight, friction engagement of the sleeve on the shaft. The main body interior bore is mounted on an exterior surface of the damper sleeve. The main body interior bore fits in tight engagement on the damper sleeve exterior surface but permits rotational, sliding movement of the actuator main body over the damper sleeve. In addition, the damper sleeve has an axial length that is slightly larger than the axial length of the actuator main body and prevents the main body from becoming trapped or wedged between the rotor and thrust washer on the opposite side of the main body when the actuator is assembled to the motor shaft.

A pair of diametrically opposite main body tabs project radially outwardly and axially from the actuator main body. A pair of diametrically opposite damper sleeve tabs project radially outwardly and axially from the damper sleeve. The main body tabs project into an arcuate spacing between the damper sleeve tabs and the damper sleeves tabs project into an arcuate spacing between the main body tabs. The sliding friction engagement of the actuator main body center bore on the damper sleeve exterior surface allows limited rotational movement between the main body and the damper during operation of the motor that reduces the clicking or chattering noise generated in the component parts of the actuator due to the torque pulses of the motor delivered to the actuator. The positioning of the main body tabs in the arcuate space between the damper sleeve tabs and the positioning of the damper sleeve tabs in the arcuate space between the main body tabs provides a positive driving connection between the damper sleeve and the main body when their respective tabs are rotated relative to each other into engagement. Thus, the construction of the centrifugal actuator of the invention with the damper sleeve that allows limited rotational movement of the main body relative to the sleeve reduces the clicking or chattering noise of the actuator components due to torque pulses transmitted to the actuator while providing a positive driving engagement between the motor shaft, damper sleeve and actuator main body without requiring the additional expense of machining annular grooves in the motor shaft and assembling c-rings into the grooves.

BRIEF DESCRIPTION OF THE DRAWINGS

Further features of the invention are revealed in the following detailed descriptions of the preferred embodiments of the invention and in the drawing figures wherein.

DETAILED DESCRIPTION OF THE PREFERRED EMBODIMENTS

Figure 1:
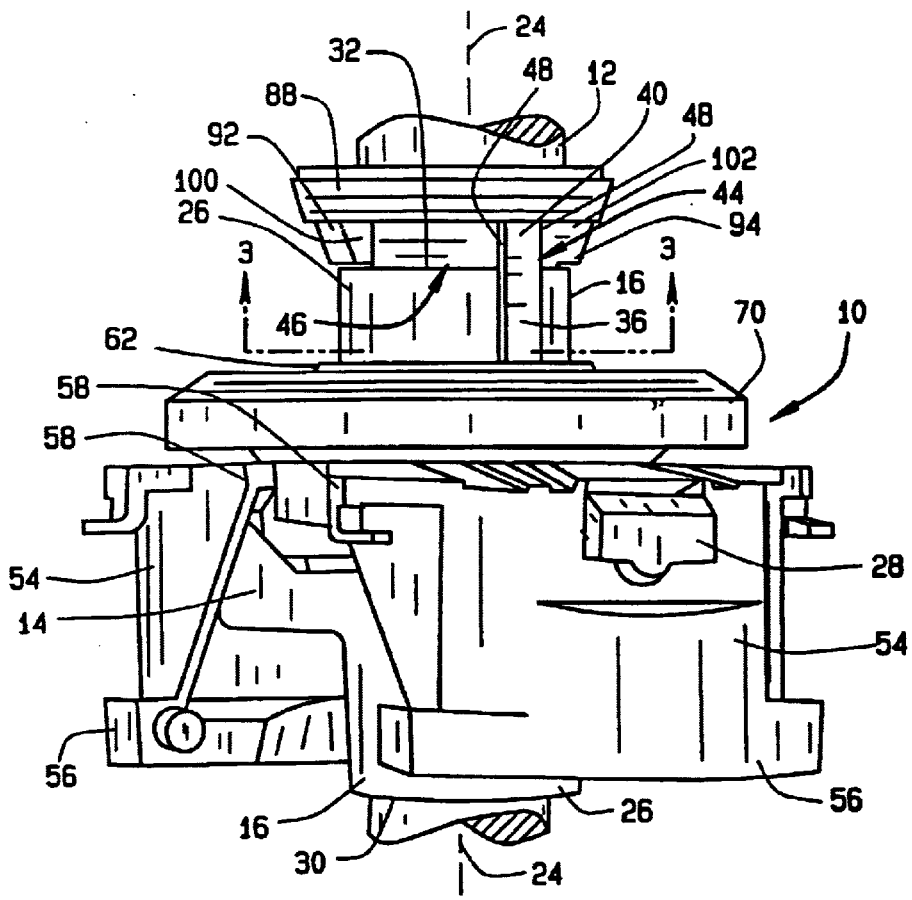
FIG. 1 is a side view of a first embodiment of the centrifugal actuator of the invention mounted on an electric motor shaft.
Figure 2:
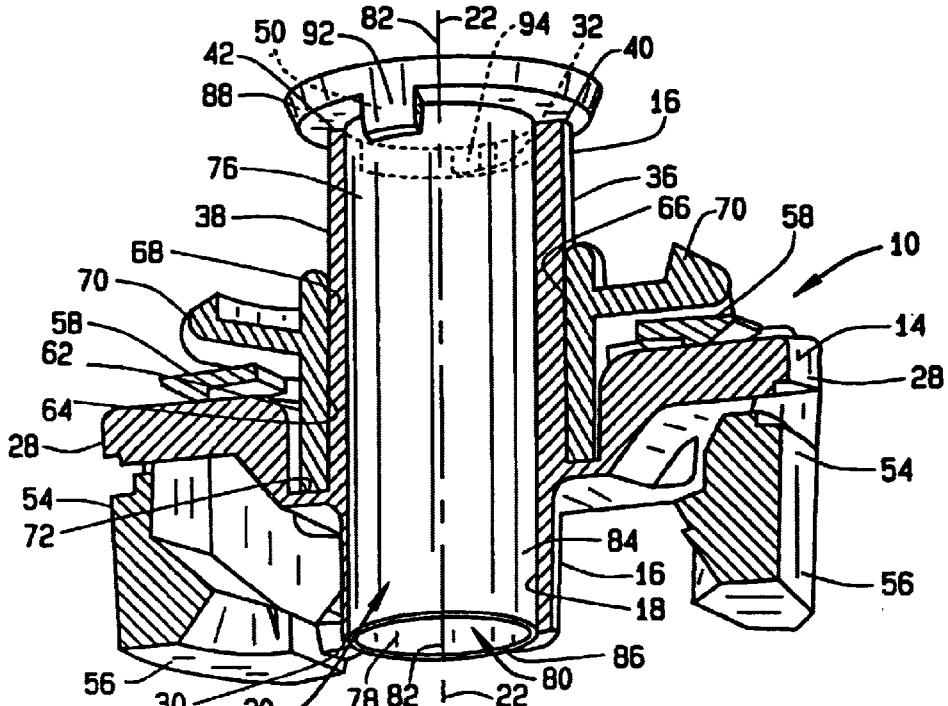
FIG. 2 is a partially sectioned view of the actuator of FIG. 1 shown removed from the motor shaft.

FIG. 1 shows the centrifugal actuator 10 of the invention mounted on an electric motor shaft 12. FIG. 2 shows the centrifugal actuator 10 of FIG. 1 removed from the motor shaft and with a portion of the actuator components cut away to better illustrate the novel features of the invention. As explained earlier, the centrifugal actuator 10 of the Invention is comprised of many of the component parts of a typical, prior art centrifugal actuator such as that disclosed in the earlier referenced U.S. Pat. No. 3,609,421. Because these component parts of the actuator are known in the prior art, they are described only generally herein.

The actuator includes a main body 14 of the actuator that has a tube or sleeve portion 16. The main body tube 16 has a cylindrical interior surface 18 that surrounds a center bore 20 of the tube. The main body tube center bore 20 has a center axis 22 that is coaxial with an axis 24 of the motor shaft when the centrifugal actuator is mounted on the motor shaft. Unlike the prior art centrifugal actuator, the cylindrical interior surface 18 of the main body tube 16 is dimensioned slightly larger than the exterior diameter of the motor shaft 12, providing a clearance between the main body cylindrical interior surface 18 and the exterior surface of the motor shaft 12. The main body tubular portion 16 has a generally cylindrical exterior surface 26 with a pair of support flanges 28 projecting radially outwardly from diametrically opposite sides of the exterior surface 26. A pair of circular end surfaces 30, 32 at the axially opposite ends of the main body extend between the main body interior surface 18 and the main body exterior surface 26.

The construction of the centrifugal actuator main body 14 described to this point is substantially the same as that of prior art centrifugal actuators except for the larger interior bore dimension. However, the actuator main body 14 of the invention also differs from prior art actuator main bodies in that it is provided with a pair of ridges 34, 36 that extend axially along a portion of the main body exterior surface 26 on diametrically opposite sides of the main body. Each ridge 36, 38 has a rectangular cross section and projects radially outwardly from the main body exterior surface 26. Each ridge 36, 38 extends axially from one of the main body support flanges 28 across the exterior surface 26 to one of the main body circular end surfaces 32. As seen in FIGS. 1 and 2, the ridges 38, 38 each terminate at a tab 40, 42 that projects axially beyond the main body circular end surface 32 for a short distance. The main body tabs 40, 42 have the same cross section configuration as the ridges 36, 38 and therefore project radially outwardly from the main body circular end surface 32 as they extend axially beyond the main body circular end surface 32. Like the main body ridges 36, 38 the tabs 40, 42 are positioned on diametrically opposite sides of the main body 14 and define a pair of arcuate spaces or notches 44, 46 that extend around the motor shaft 12 between opposed surfaces 48, 50 of the respective tabs 40, 42.

A pair of lever arms 54 are mounted on the distal ends of the pair of main body support flanges 28 for pivoting movement of the lever arms in the same manner as in the prior art. As is done in the prior art, each of the lever arms 54 is formed as a bell crank with a weight 56 at one end of the arm and a pronged portion 58 at the opposite end of the arm. As is conventional, an intermediate portion of each lever arm 54 is mounted to the distal end of one of the main body support flanges 28 for a pivoting movement of the lever arm in response to rotation of the motor shaft 12.

An actuator sleeve 62 is mounted on the main body exterior surface 26 for axial sliding movement over the exterior surface. The actuator sleeve 62 has a generally cylindrical interior surface 64 that is dimensioned to slide axially over the main body exterior surface 26 between first and second positions of the actuator sleeve relative to the main body. The actuator sleeve interior surface 64 is provided with a pair of axial grooves 66, 68 on diametrically opposite sides of the interior surface. The pair of axial grooves 66, 68 receive the main body ridges 36, 38 for sliding movement of the ridges through the grooves. Thus, the pair of grooves 66, 68 will permit the actuator sleeve 62 to reciprocate axially over the main body exterior surface 26 between the first and second positions of the actuator sleeve relative to the main body while preventing relative rotation between the actuator sleeve and the main body.

An annular flange 70 projects radially outwardly from an exterior surface 72 of the actuator sleeve. The annular flange 70 of the actuator sleeve is constructed and functions in basically the same manner as that of the prior art centrifugal actuator. In addition, the actuator sleeve is operatively connected to the pronged portions 58 of the actuator lever arms 54 to move the actuator sleeve 62 axially between its first and second positions relative to the main body 14 in response to the movement of the lever arms 54. Again, apart from the presence of the pair of grooves 66, 68 in the interior surface of the actuator sleeve 62, its construction and functioning is basically the same as that as the prior art actuator sleeve.

The centrifugal actuator 10 of the present invention differs from the prior art centrifugal actuator in that it also includes a damper sleeve 76 as one of its component parts. The damper sleeve 76 has an axial length that Is slightly longer than that of the actuator main body 14. The sleeve has a cylindrical interior surface 78 that surrounds a center bore 80 of the sleeve. The center bore 80 has a center axis 82 that is coaxial with the shaft center axis 24 when the actuator is mounted on the shaft. The interior diameter of the sleeve interior surface 78 is dimensioned so that the sleeve will fit in a tight friction engagement on the exterior of the motor shaft 12 when the actuator is, mounted on the shaft.

The damper sleeve has a generally cylindrical exterior surface 84 that has an exterior diameter dimension that allows the damper sleeve to be mounted in a sliding engagement in the interior bore 20 of the actuator main body 14. The sliding engagement between the main body bore Interior surface 18 and the damper sleeve exterior surface 84 permits the main body to rotate slightly on the damper sleeve exterior surface 84 in response to torque pulses of the electric motor transmitted through the motor shaft 12 and the damper sleeve 76 to the actuator main body 14. Despite this limited slip permitted between the main body 14 and the damper sleeve 76, the sliding engagement between the main body and damper sleeve causes them to rotate with each other and causes the centrifugal actuator 10 to operate in the same manner as prior art centrifugal actuators in switching between two windings of an electric motor.

As best seen in FIG. 2, the damper sleeve has one circular end surface 86 that is positioned in substantially the same plane as one of the circular end surfaces 30 of the main body. The axially opposite end of the damper sleeve has an annular thrust washer 88 formed integrally with the sleeve. As seen in FIGS. 1 and 2, the thrust washer 88 is positioned axially relative to the projecting tabs 40, 42 of the actuator main body so that there is a small axial tolerance or spacing between the thrust washer 88 and the distal ends of the main body tabs 40,42. Thus, the axial length of the damper sleeve exterior surface 84 is slightly larger than the axial length of the main body interior bore surface 18. Because the axial length of the damper sleeve exterior surface 84 is slightly larger than the axial length of the main body interior bore surface 18, the damper sleeve will prevent the main body from becoming trapped between the rotor and the thrust washer 88 at opposite ends of the actuator when the actuator is mounted on the motor shaft The distal ends of the main body tabs 40, 42 engage in sliding engagement with the thrust washer 88 to maintain the proper axial positioning between the actuator main body 14 and the actuator damper sleeve 76. A pair of damper tabs 92, 94 project radially outwardly from the damper sleeve exterior surface 84 adjacent the thrust washer 88. The damper tabs 92, 94 extend axially from the thrust-washer 88 toward the actuator main body 14. The damper tabs 92, 94 are positioned on diametrically opposite sides of the damper sleeve and define a pair of arcuate spacings or notches 96, 98 that extend around the damper sleeve between the pairs of damper tabs. Opposite surfaces 100, 102 of the respective damper tabs 92, 94 define the lengths of the arcuate spaces or notches 96, 98 between the tabs. As seen in the drawing figures, with the relative positioning of the actuator main body 14 on the actuator damper sleeve 76, the main body tabs 40, 41 extend Into the arcuate spaces or notches 96, 98 between the damper tabs 92, 94, and the damper tabs 92, 94 extend Into the arcuate spaces or notches 44, 46 between the main body tabs. When the main body tabs 40, 42 engage against the damper tabs 92, 94 a positive driving engagement is established between the main body 14 and the damper sleeve 76. Thus, the ability of the main body tabs and the damper tabs to move through the arcuate spacings or notches between the respective tabs allows the limited rotational movement between the actuator main body, 14 and the actuator damper sleeve 76. This limited rotational movement is slightly less than one-half of a rotation of the actuator main body 14 on the actuator sleeve 76, due to the circumferential thicknesses of the respective main body tabs and damper sleeve tabs.

Figure 3:
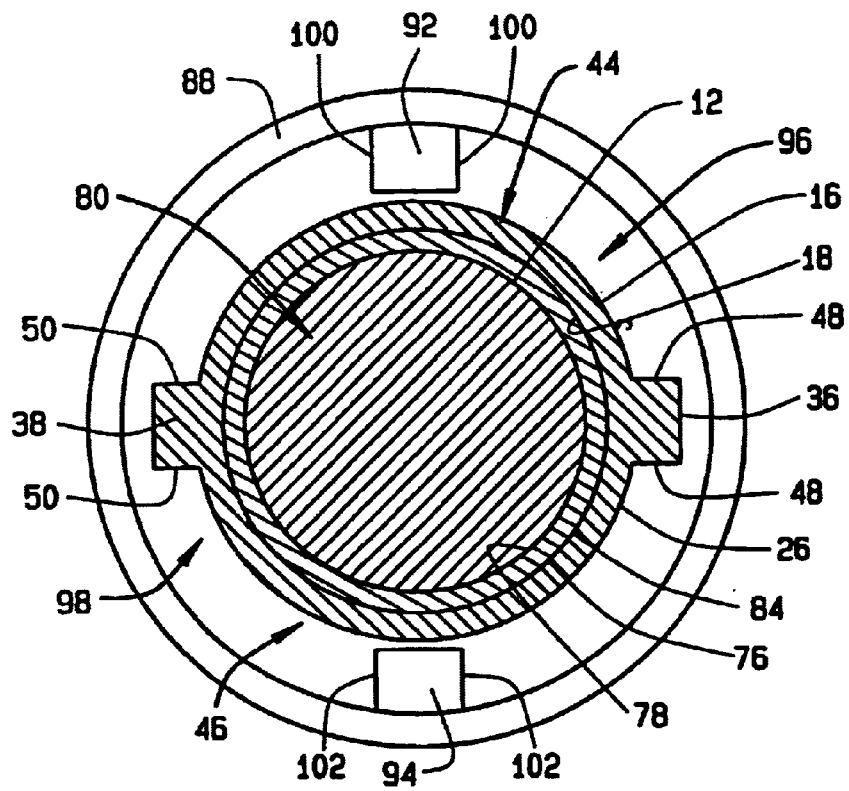
FIG. 3 is a cross section view in the plane of line 3—3 of FIG. 1.

In the operation of the embodiment of the centrifugal actuator 10 of FIGS. 1 through 3, as the electric motor (not shown) is started, rotation of the motor shaft 12 is transmitted to the centrifugal actuator 10 through the friction engagement of the damper sleeve 76 on the motor shaft 12 and the friction engagement of the actuator main body 14 on the damper sleeve. Any relative slip between the actuator main body 14 and the damper sleeve 76 will be eliminated by positive engagement of the main body tabs 40, 42 with the damper sleeve tabs 92, 94. When the motor has attained a relatively constant speed with the run windings of the motor actuated, the torque pulses created by power source current reversals in the stator run windings will be transmitted from the centrifugal actuator damper sleeve 76 to the actuator main body 14. However, due to the friction engagement between the main body 14 and the damper sleeve 76, the main body will be allowed to rotate to a limited extent relative to the damper sleeve, thus reducing or attenuating the torque pulses. In this manner, the dicing or chattering of prior art centrifugal actuators due to torque pulses of the motor is reduced or eliminated. The relative slipping between the main body 14 and damper sleeve 76 will constantly continue as the torque pulses of the motor tend to accelerate and then decelerate the rotation of the motor shaft 12 and the centrifugal actuator 10. However, as the main body 14 may be caused to rotate to a limited extent relative to the damper sleeve 76, a positive driving engagement will always be maintained between the main body 14 and the damper sleeve 76 due to the circumferential overlapping positioning of the main body tabs 40, 42 and the damper sleeve tabs 92, 94.

Thus, the construction of the centrifugal actuator of the invention with the damper sleeve that allows limited rotational movement between the main body relative to the damper sleeve reduces the clicking or chattering noise of the actuator components due to torque pulses transmitted to the actuator while providing a positive driving engagement between the motor shaft, the damper sleeve and the actuator main body without requiring the additional expense of machining annular grooves in the motor shaft and assembling c-rings into the grooves.

Figure 6:
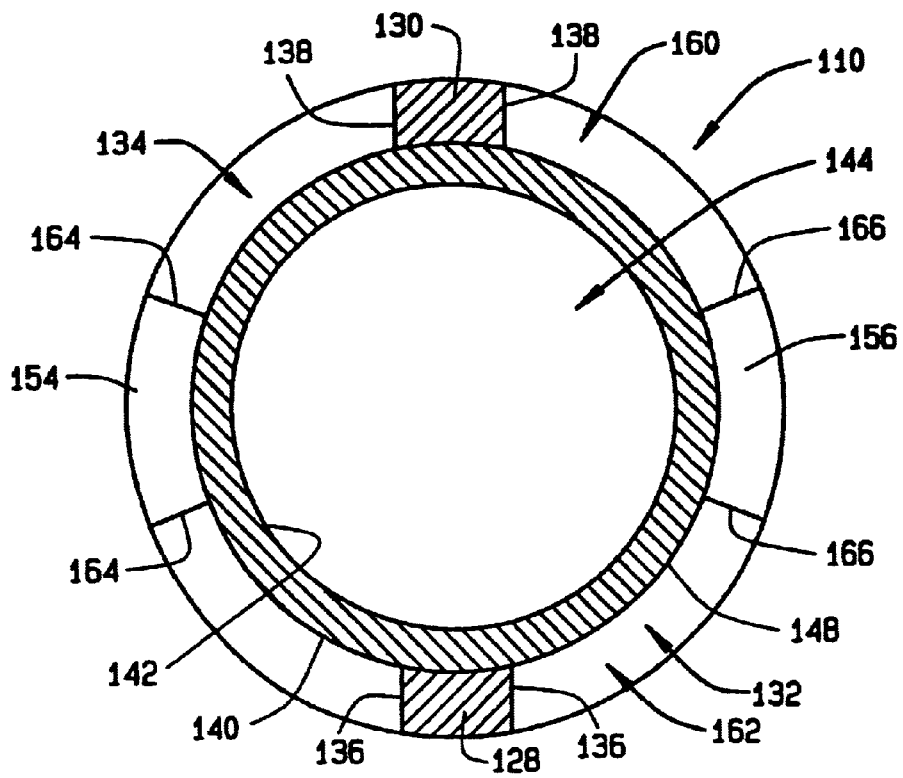
Figure 4:
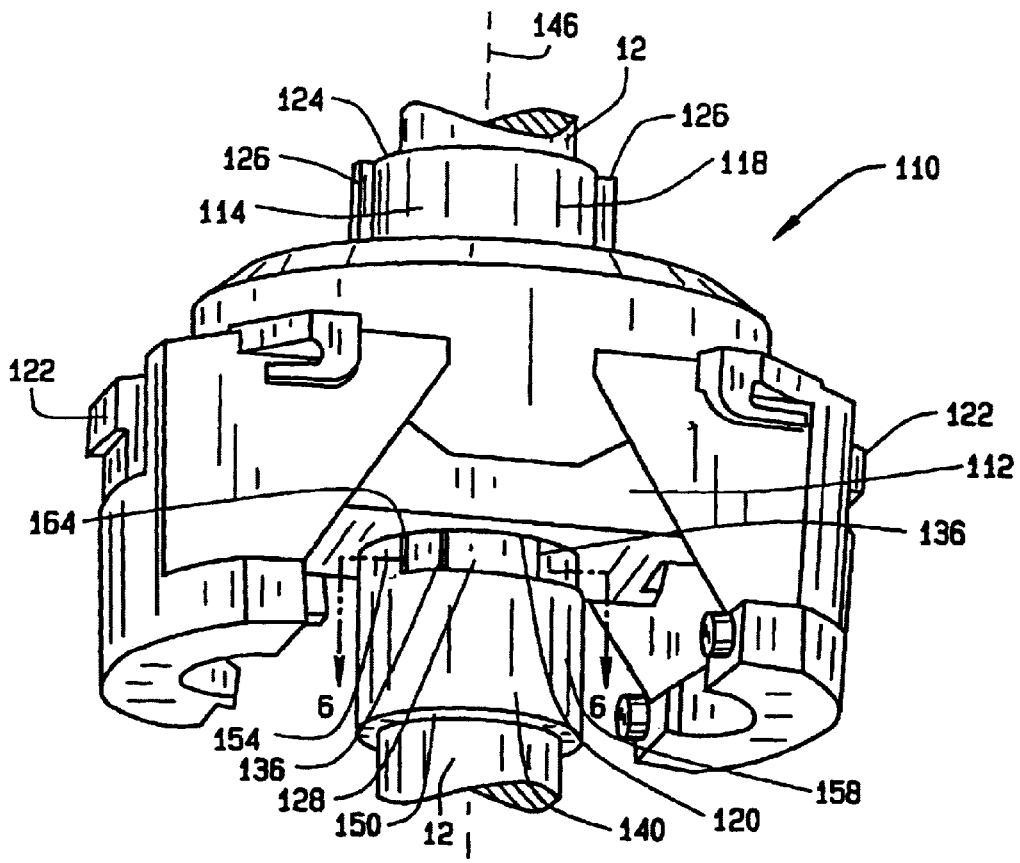
FIG. 4 is a side view of a second embodiment of the centrifugal actuator of the invention mounted on an electric motor shaft.
Figure 5:
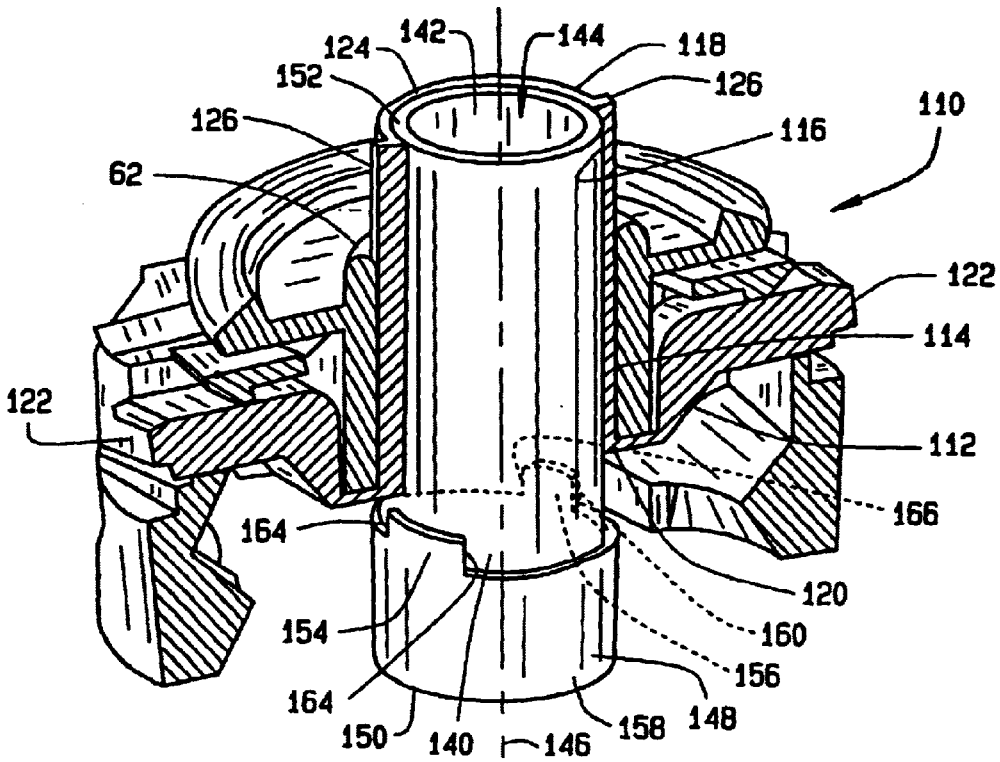
FIG. 5 is a partially sectioned view of the centrifugal actuator of FIG. 4 shown removed from the motor shaft; and, FIG. 6 is a cross section view in the plane of line 6—6 of FIG. 4.

FIGS. 4 through 6 show an alternate embodiment of the centrifugal actuator 10 of FIGS. 1 through 3. Many of the component parts of the centrifugal actuator 110 of the FIGS. 4 through 6 are the same as those of the previously described embodiment of the actuator and are labeled with the same reference numbers. Because the centrifugal actuator 110 of FIGS. 4 through 6 is very similar to that of FIGS. 1 through 3, only the differences between the actuator assemblies will be described.

The second embodiment of the centrifugal actuator 110 also has an actuator main body 112. The actuator sleeve 62 is mounted on the main body 112 in the same manner as the previous embodiment. In addition, the lever arms 54 are mounted on the main body in the same manner as the previously described embodiment However, the tubular portion 114 of the second embodiment of the actuator main body 112 has a shorter axial length than the previously described embodiment As seen in FIGS. 4 and 5, the main body tubular portion 114 has a cylindrical interior surface 118 and a generally cylindrical exterior surface 118 that are similar to those of the previously described embodiment. However, the axial length of the main body tubular portion 114 is less than that of the previously described embodiment. The tubular portion 114 has a circular end surface 120 at one end of the main body that is adjacent to the pair of support flanges 122 of the main body. The tubular portion extends to a circular end surface 124 at the opposite end of the main body. A pair of diametrically opposite ridges 126 extend across the main body exterior surface 116, but do not project axially beyond the second circular end surface 124 of the main body, as they did in the first embodiment. Instead, the second embodiment of the centrifugal actuator 110 has a pair of main body tabs 128 that project axially from the one end surface 120 of the main body that is adjacent the support flanges 122. With the pair of main body tabs 128, 130 projecting from diametrically opposite sides of the main body 112, they define a pair of arcuate spacings or notches 132, 134 that extend around the centrifugal actuator between opposing surfaces 136, 138 of the respective main body tabs 128, 136.

The damper sleeve 140 of the second embodiment has a cylindrical interior surface 142 that surrounds a center bore 144 of the damper sleeve. As in the first embodiment, the cylindrical interior surface 142 is dimensioned for a tight friction fit on the motor shaft The damper sleeve center bore 144 has a center axis 146 that is coaxial with the center axis of the motor shaft 12 when the centrifugal actuator is mounted on the motor shaft. The damper sleeve 140 also has a generally cylindrical exterior surface 148 that extends between a first circular end surface 150 and an opposite second circular end surface 152 of the sleeve. However, there is no thrust washer provided at the second end surface of the damper sleeve as there was with the first described embodiment. The second embodiment of the centrifugal actuator 110 is employed with a separate thrust washer (not shown) positioned on the motor shaft 12 adjacent the second end surface 152 of the damper sleeve. The thrust washer may be configured as the thrust washer 80 of the first described embodiment without the damper tabs 92, 94 projecting from the thrush washer, or may be a conventional thrust washer. A pair of damper tabs 154, 156 are provided on the damper sleeve exterior surface 148 at the first end surface 150 of the damper sleeve. The axial length of the damper sleeve exterior surface 148 between the damper tabs 154,156 and the second end surface 152 of the sleeve is slightly larger than the axial length of the main body interior bore surface 116 to prevent the main body of the actuator from becoming trapped or wedged between the rotor and a thrust washer when the actuator is mounted on the shaft just as in the first embodiment. As seen in FIG. 5, an annular collar 158 projects radially outwardly from the damper sleeve exterior surface 148 adjacent the sleeve second end 152, and the pair of damper tabs 154, 156 project radially outwardly from the sleeve exterior surface 148 and axially from the annular collar 158. The damper sleeve collar 158 properly positions the damper sleeve tabs 154, 156 in axially overlapping, positions with the main body tabs 128, 130. The damper sleeve tabs 154, 156 also have arcuate spacings or notches 160, 162 that extend between opposing surfaces 164, 166 of the respective tabs.

The main body tabs 128, 130 and the damper sleeve tabs 154, 156 of the second embodiment of the centrifugal actuator 110 function in the same manner as the tabs of the previously described actuator. Thus, the respective tabs of the main body 112 and the damper sleeve 140 allow limited rotational movement of the main body relative to the damper sleeve and reduce the clicking or chattering noise of the actuator components due to torque pulses transmitted to the actuator while providing a positive driving engagement between the motor shaft, the damper sleeve and actuator main body without requiring the additional expense of machining annular grooves in the motor shaft and assembling c-rings into the grooves.

While the present invention has been described by reference to specific embodiments, it should be understood that modifications and variations of the invention may be constructed without department from the scope of the invention defined in the following claims.

What is claimed:

1. A noise reducing centrifugal actuator for an electric device that is mountable on a shaft of the electric device for rotation with the shaft, the actuator comprising:
   a damper sleeve of the actuator having an interior bore with a center axis and an interior diameter dimensioned to enable the shaft to be inserted through the bore to mount the damper sleeve on the shaft for rotation of the damper sleeve with the shaft;
   a main body of the actuator mounted on the damper sleeve for relative movement between the main body and the damper sleeve; and
   a switch actuator sleeve of the actuator mounted on the main body for axial movement of the switch actuator sleeve over the main body.

2. The actuator of claim 1 further comprising:
   the main body is mounted on the damper sleeve for relative rotational movement between the main body and the damper sleeve.

3. The actuator of claim 2, further comprising:
   means for permitting limited relative axial movement between the main body and the damper sleeve.

4. A noise reducing centrifugal actuator for an electric device that is mountable on a shaft of the electric device for rotation with the shaft, the actuator comprising:
   a damper sleeve of the actuator having an interior bore with a center axis and an interior diameter dimensioned to enable the shaft to be inserted through the bore to mount the damper sleeve on the shaft for rotation of the damper sleeve with the shaft;
   a main body of the actuator mounted on the damper sleeve for relative movement between the main body and the damper sleeve;
   a switch actuator sleeve of the actuator mounted on the main body for axial movement of the switch actuator sleeve over the main body;
   the main body being mounted on the damper sleeve for relative rotational movement between the main body and the damper sleeve; and,
   means for limiting the relative rotational movement between the main body and the damper sleeve to less than one rotation of the main body relative to the damper sleeve.

5. A noise reducing centrifugal actuator for an electric device that is mountable on a shaft of the electric device for rotation with the shaft, the actuator comprising:
   a damper sleeve of the actuator having an interior bore with a center axis and an interior diameter dimensioned to enable the shaft to be inserted through the bore to mount the damper sleeve on the shaft for rotation of the damper sleeve with the shaft;
   a main body of the actuator mounted on the damper sleeve for relative movement between the main body and the damper sleeve;
   a switch actuator sleeve of the actuator mounted on the main body for axial movement of the switch actuator sleeve over the main body; and,
   at least one lever mounted on the main body for pivoting movement of the lever relative to the main body, the lever being operatively connected to the switch actuator sleeve to cause the switch actuator sleeve to move axially over the main body in response to the pivoting movement of the lever.

6. The actuator of claim 1, further comprising:
   the damper sleeve has a cylindrical interior surface that surrounds the sleeve interior bore and an opposite cylindrical exterior surface, the main body has an interior bore with a center axis and a cylindrical interior surface of the main body surrounding the main body interior bore, and the damper sleeve is received in the main body interior bore with the damper sleeve exterior surface in sliding engagement with the main body interior surface.

7. A noise reducing centrifugal actuator for an electric device that is mountable on a shaft of the electric device for rotation with the shaft, the actuator comprising:
   a damper sleeve of the actuator having an interior bore with a center axis and an interior diameter dimensioned to enable the shaft to be inserted through the bore to mount the damper sleeve on the shaft for rotation of the damper sleeve with the shaft;
   a main body of the actuator mounted on the damper sleeve for relative movement between the main body and the damper sleeve;
   a switch actuator sleeve of the actuator mounted on the main body for axial movement of the switch actuator sleeve over the main body; and,
   a notch in one of the main body and the damper sleeve and a tab on the other of the main body and the damper sleeve, the tab being positioned in the notch.

8. The actuator of claim 7, further comprising:
   the notch having a width dimension around the interior bore center axis of the damper sleeve and the tab having a width dimension that is smaller than the notch width dimension and enables the tab to move across the width dimension of the notch.

9. The actuator of claim 7, further comprising:
the tab being a damper tab that projects from the damper and the main body having a pair of main body tabs that project from the main body with the notch being one of a pair of notches between the main body tabs.

10. The actuator of claim 7, further comprises:
the tab being a main body tab that projects from the main body and the damper having a pair of damper tabs that project from the damper with the notch being one of a pair of notches between the damper tabs.

11. The actuator of claim 1, further comprising:
a pair of axially oriented surfaces with a spacing therebetween on one of the main body and the damper sleeve and a tab on the other of the main body and damper sleeve that extends into the spacing between the pair of surfaces.

12. The actuator of claim 11, further comprising:
the pair of surfaces being spaced from each other around the center axis of the damper sleeve center bore.

13. A noise reducing centrifugal actuator for an electric device that is mountable on a shaft of the electric device for rotation with the shaft about a rotational axis of the shaft, the actuator comprising:
a damper of the actuator that is mountable on the shaft for rotation of the damper with the shaft;
a main body of the actuator that is mountable on the shaft in a position adjacent the damper;
a pair of surfaces on one of the damper and the main body with a spacing between the pair of surfaces, the spacing extending around only a portion of the shaft when the damper and the main body of the actuator are mounted on the shaft, and
a tab on the other of the main body and the damper, the tab extending into the spacing between the pair of surfaces and enabling limited relative rotational movement between the damper and the main body when the damper and the main body are mounted on the shaft.

14. The actuator of claim 13, further comprising:
a switch operator mounted on the main body for axial movement of the switch operator relative to the main body.

15. The actuator of claim 14, further comprising:
a lever mounted on the main body for pivoting movement of the lever relative to the main body, the lever being operatively connected to the switch operator to cause the switch operator to move axially relative to the main body in response to the pivoting movement of the lever relative to the main body.

16. The actuator of claim 13, further comprising:
a notch in one of the damper and the main body and the notch having the pair of surfaces on opposite sides of the notch with the spacing being in the notch.

17. The actuator of claim 13, further comprising:
the tab being a damper tab that projects from the damper and the main body having a pair of main body tabs that project from the main body, each surface of the pair of surfaces being on each main body tab and the damper tab projecting from the damper into the spacing between the pair of surfaces on the pair of main body tabs.

18. The actuator of claim 17, further comprising:
the damper tab projects axially from the damper toward the main body and the pair of main body tabs project axially from the main body toward the damper.

19. The actuator of claim 13, further comprising:
the tab being a main body tab that projects from the main body and the damper having a pair of damper tabs that project from the damper, each surface of the pair of surfaces being on each damper tab and the main body tab projecting from the main body into the spacing between the pair of surfaces on the pair of damper tabs.

20. The actuator of claim 19, further comprising:
the main body tab projects axially from the main body toward the damper and the pair of damper tabs project axially from the damper toward the main body.

21. The actuator of claim 13, further comprising:
the damper having a cylindrical sleeve that is mountable on the shaft for rotation with the shaft and the main body is mounted on the cylindrical sleeve for relative rotational movement between the damper and the main body.

* * * * *